United States Patent
Li (10) Patent No.: US 8,559,888 B2
(45) Date of Patent: Oct. 15, 2013

(54) SIGNAL POLARIZATION METHOD, APPARATUS, AND SYSTEM

(71) Applicant: Shaoming Li, Shenzhen (CN)

(72) Inventor: Shaoming Li, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 13/668,905

(22) Filed: Nov. 5, 2012

(65) Prior Publication Data

US 2013/0059617 A1  Mar. 7, 2013

Related U.S. Application Data

(63) Continuation of application No. PCT/CN2010/072486, filed on May 6, 2010.

(51) Int. Cl.
 *H04B 17/00* (2006.01)

(52) U.S. Cl.
 USPC ..................................... 455/67.16; 455/67.11

(58) Field of Classification Search
 USPC ............ 342/362–365; 455/67.11, 63.1, 67.16
 See application file for complete search history.

(56) References Cited

U.S. PATENT DOCUMENTS

| | | | |
|---|---|---|---|
| 3,827,051 A | | 7/1974 | Foldes |
| 4,005,414 A | * | 1/1977 | Goggins, Jr. .................. 342/188 |
| 4,590,480 A | * | 5/1986 | Nikolayuk et al. ............ 343/771 |
| 5,668,558 A | | 9/1997 | Hong |
| 5,691,727 A | * | 11/1997 | Cyzs ............................. 342/361 |
| 6,047,168 A | | 4/2000 | Carlsson et al. |
| 7,098,859 B2 | | 8/2006 | Shimawaki et al. |
| 7,113,748 B2 | * | 9/2006 | Shapira et al. ............... 455/63.4 |
| 7,594,354 B1 | * | 9/2009 | Chadwick ..................... 43/21.2 |
| 7,991,374 B2 | * | 8/2011 | Laroia et al. ................. 455/273 |
| 2004/0043736 A1 | | 3/2004 | Hamalainen et al. |
| 2006/0097940 A1 | | 5/2006 | Shimawaki et al. |
| 2007/0135050 A1 | | 6/2007 | Schiff |

FOREIGN PATENT DOCUMENTS

| CN | 1052975 | 7/1991 |
|---|---|---|
| CN | 1139300 | 1/1997 |

(Continued)

OTHER PUBLICATIONS

International Search Report of PCT/CN2010/072486 mailed Jan. 6, 2011.
International Search Report issued Jan. 6, 2011 in corresponding International Patent Application No. PCT/CN2010/072486 (2 pages) (6 pages English translation).
English Translation of Written Opinion of the International Searching Authority issued Jan. 6, 2011 in corresponding International Patent Application No. PCT/CN/2010/072486 (3 pages).

(Continued)

*Primary Examiner* — Lewis West
(74) *Attorney, Agent, or Firm* — Staas & Halsey LLP (57) ABSTRACT

The present invention discloses a signal polarization method, apparatus and system, and relates to the field of cellular network technologies. At the time of adjusting a polarization manner of a signal, an antenna does not need to be replaced, and a physical installation posture of the antenna does not need to be adjusted manually either. Therefore, a manual requirement and an operation cost are reduced, a workload, work risk and time are reduced, and a normal operation of a service of a cell is ensured. The signal polarization method provided in the embodiments of the present invention includes: receiving physical channel signals sent by a base transceiver station; determining a polarization manner of each physical channel signal; and polarizing, by adjusting at least one of an amplitude and a phase of each physical channel signal, the physical channel signals according to the polarization manner.

13 Claims, 6 Drawing Sheets

(56) References Cited

FOREIGN PATENT DOCUMENTS

| | | |
|---|---|---|
| CN | 1223759 | 2/1999 |
| CN | 101431359 | 5/2005 |
| CN | 2729936 | 9/2005 |
| CN | 101356749 | 1/2009 |
| EP | 1 367 741 A2 | 12/2003 |
| WO | WO 01/86823 A2 | 11/2001 |
| WO | WO 2006/071153 A1 | 7/2006 |
| WO | 2011/137588 | 11/2011 |

OTHER PUBLICATIONS

First Chinese Office Action mailed Apr. 27, 2013 in corresponding Chinese Patent Application No. 201080007132.7 (4 pages), (4 pages of English Translation).

Chinese Search Report mailed Apr. 19, 2013 in corresponding Chinese Patent Application No. 201080007132.7 (2 pages).

Extended European Search Report mailed Jun. 20, 2013 in corresponding European Patent Application No. 10850957.1—1811/2555421 (7 pages).

* cited by examiner

SIGNAL POLARIZATION METHOD, APPARATUS, AND SYSTEM

CROSS-REFERENCE TO RELATED APPLICATIONS

This application is a continuation of International Application No. PCT/CN2010/072486, filed on May 6, 2010, which is hereby incorporated by reference in its entirety.

FIELD OF THE INVENTION

The present invention relates to the field of cellular network technologies, and in particular, to a signal polarization method, apparatus, and system.

BACKGROUND OF THE INVENTION

Figure 1:
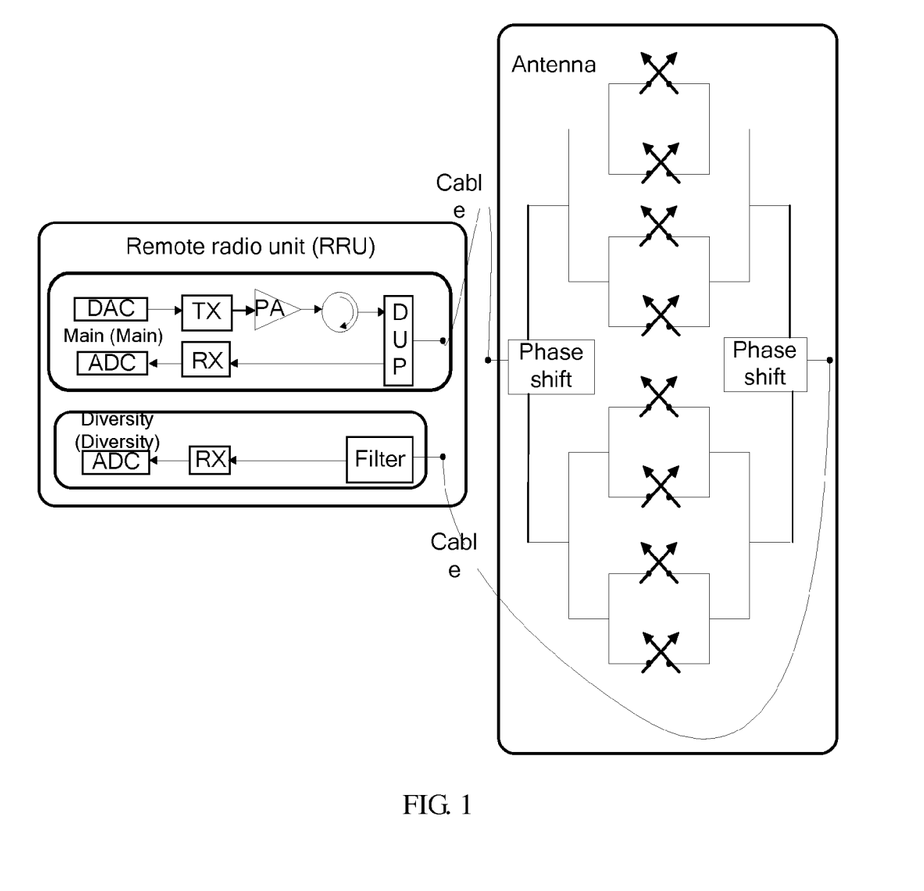
FIG. 1 is a schematic diagram of an antenna transmitting and receiving system in a cellular network in the prior art.

In an existing cellular network system, transmitting antennas (Antenna) in the form such as vertical polarization, +45°/−45° dual polarization, or vertical/horizontal dual polarization are generally adopted. FIG. 1 is a schematic diagram of an antenna transmitting and receiving system in a cellular network. The system includes a base transceiver station (Base Transceiver Station, BTS) and an antenna. A remote radio unit (Remote Radio Unit, RRU) in the base transceiver station includes a digital-to-analog converter (Digital Analog Converter, DAC), an analog-to-digital converter (Analog Digital Converter, ADC), a transmitting/receiving (TX/RX) module, a filter (Filter), a power amplifier (PA), and so on, which are not described in detail here. In a downlink direction, the remote radio unit feeds a generated radio signal from an antenna input port into the antenna through a cable (Cable), and then the antenna transmits the radio signal to the air; and in an uplink direction, the antenna receives a radio signal transmitted by a terminal from the air, and transmits the radio signal to the remote radio unit for processing. The radio signal generally includes multiple carrier signals of one cell, and each carrier includes physical channel signals in multiple kinds of multiplexing manners such as code division multiplexing, frequency division multiplexing or time division multiplexing.

During implementation of the present invention, the inventor finds that the prior art has at least the following problems:

A polarization manner of a signal transmitted by an antenna in the prior art is fixed when the antenna is installed physically, and all signals in all carriers in one cell can be transmitted only in a uniform polarization manner. If the polarization manner of the signal needs to be adjusted, the antenna needs to be replaced, for example, when linear polarization and circular polarization are adopted, different antennas are required; or, a physical installation posture of the antenna needs to be adjusted manually, thereby increasing a cost of a manual operation and a risk and time of an operation such as readjustment of a tilt angle of the antenna, so that a workload is too high, and furthermore, a normal operation of a service of the cell is interrupted.

SUMMARY OF THE INVENTION

Embodiments of the present invention provide a signal polarization method, apparatus, and system, so as to solve a problem caused by that a polarization manner of a signal transmitted by an antenna is fixed when the antenna is installed physically in the prior art, reduce a manual requirement and an operation cost, reduce a workload, risk and time, and ensure a normal operation of a service of a cell.

An embodiment of the present invention provides a signal polarization method, including:

receiving physical channel signals sent by a base transceiver station;

determining a polarization manner of each physical channel signal; and polarizing, by adjusting at least one of an amplitude and a phase of each physical channel signal, the physical channel signals according to the polarization manner.

Another embodiment of the present invention provides a signal polarization apparatus, including:

a signal transmitting and receiving unit, configured to receive physical channel signals sent by a base transceiver station;

a polarization determining unit, configured to determine a polarization manner of each physical channel signal; and a polarization generating unit, configured to polarize, by adjusting at least one of an amplitude and a phase of each physical channel signal, the physical channel signals according to the polarization manner.

Another embodiment of the present invention provides a dual-polarized antenna system. An antenna in the system includes at least two polarization units, and the system includes the foregoing signal polarization apparatus.

With the technical solutions provided in the embodiments of the present invention, a polarization manner of each physical channel signal in each carrier is distinguished, and at least one of an amplitude and a phase of each physical channel signal is adjusted, and a technical means for polarizing a physical channel signal in a required polarization manner is implemented. In this way, a solution to adjusting the signal polarization manner online, dynamically, and in real time is provided, so that a manual requirement and an operation cost are reduced, a workload, risk and time are reduced, and a normal operation of a service of a cell is ensured.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following descriptions are merely some of the embodiments of the present invention, and persons of ordinary skill in the art may also obtain other drawings according to these accompanying drawings without creative efforts.

DETAILED DESCRIPTION OF THE EMBODIMENTS

The technical solutions in the embodiments of the present invention are described clearly and completely in the following with reference to the accompanying drawings in the embodiments of the present invention. Apparently, the embodiments to be described are only a part rather than all of the embodiments of the present invention. Based on the embodiments of the present invention, all other embodiments obtained by persons of ordinary skill in the art without creative efforts shall fall within the protection scope of the present invention.

Figure 2:
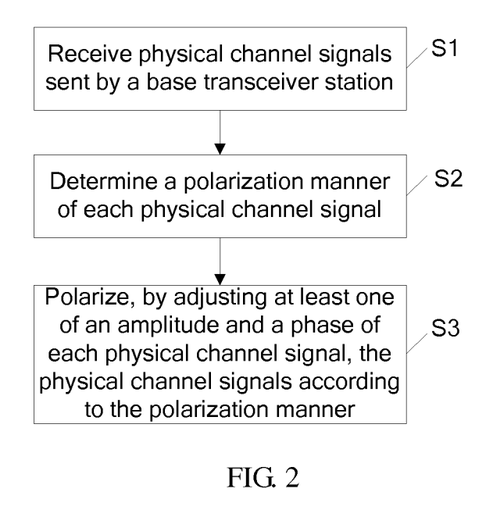
FIG. 2 is a schematic flowchart of a signal polarization method according to an embodiment of the present invention.

An embodiment of the present invention provides a signal polarization method. As shown in FIG. 2, the method includes:

S1: Receive physical channel signals sent by a base transceiver station.

S2: Determine a polarization manner of each physical channel signal.

S3: Polarize, by adjusting at least one of an amplitude and a phase of each physical channel signal, the physical channel signals according to the polarization manner.

The polarization manner includes but is not limited to +45° linear polarization (Linear Polarization), −45° linear polarization, vertical linear polarization (Vertical Linear Polarization), horizontal linear polarization (Horizontal Linear Polarization), linear polarization at any angle θ, left-hand circular polarization, right-hand circular polarization, general left-hand circular polarization, general right-hand circular polarization, polarization of any shape, and so on.

With the technical solution provided in this embodiment of the present invention, a polarization manner of each physical channel signal in each carrier is distinguished, and an amplitude or a phase of each physical channel signal is adjusted to polarize the physical channel signals in a corresponding polarization manner. The technical solution in this embodiment of the present invention provides a solution to adjusting the signal polarization manner online, dynamically and in real time. Furthermore, at the time of adjustment, an antenna does not need to be replaced, and a physical installation posture of the antenna does not need to be adjusted manually either. Therefore, a manual requirement and an operation cost are reduced, a workload, work risk and time are reduced, and a normal operation of a service of a cell is ensured.

With reference to FIG. 2, a signal polarization method provided in another embodiment of the present invention is described in detail in the following. A solution for adjusting a polarization manner online (On-line) and in real time (Real Time) is provided in this embodiment of the present invention. Illustratively, a signal polarization apparatus is used to implement the solution provided in this embodiment of the present invention. The method specifically includes the following processing:

S1: Receive physical channel signals sent by a base transceiver station.

First, the base transceiver station sends a radio signal to a signal polarization apparatus through a cable. The signal polarization apparatus may also has a beam forming function and serves as a beam forming unit (Beamforming Unit). That is, the signal polarization apparatus or the beam forming unit implements the solution provided in this embodiment of the present invention.

The radio signal generally includes multiple carrier signals of one cell, and each carrier may include physical channel signals in multiple kinds of multiplexing manners such as code division multiplexing, frequency division multiplexing or time division multiplexing.

S2: Determine a polarization manner of each physical channel signal.

Illustratively, the signal polarization apparatus may select a polarization manner of each physical channel signal in real time according to a requirement of a user or a scene; or, a special list is preset in the signal polarization apparatus to store various polarization manners, and the polarization manners in the list are adopted in sequence for each physical channel signal according to an order of transmitting the physical channel signals; or, the signal polarization apparatus records correspondence between each physical channel signal and an adopted polarization manner in the special list, and queries the special list to obtain a polarization manner corresponding to a physical channel signal.

The polarization manner includes but is not limited to +45° linear polarization (Linear Polarization), −45° linear polarization, vertical linear polarization (Vertical Linear Polarization), horizontal linear polarization (Horizontal Linear Polarization), linear polarization at any angle θ, left-hand circular polarization, right-hand circular polarization, general left-hand circular polarization, general right-hand circular polarization, polarization of any shape, and so on.

S3: Polarize, by adjusting at least one of an amplitude and a phase of each physical channel signal, the physical channel signals according to the polarization manner.

In this embodiment of the present invention, the physical channel signals may be distinguished into two channels of signals, and the physical channel signals are polarized according to the polarization manner by respectively adjusting at least one of amplitudes and phases of the two channels of signals.

For example, the signal polarization apparatus distinguishes the physical channel signals into two channels of signals according to transmit power of a corresponding physical channel; and when the physical channel signals are expressed as S(t), the physical channel signals are distinguished into two channels of signals according to the following formula. The two channels of signals $S_+(t)$ and $S_-(t)$ corresponding to S(t) are respectively expressed as:

$$S_+(t)=A_+\exp(j\phi_+)S(t); \; S_-(t)=A_-\exp(j\phi_-)S(t).$$

$A_+$ is a first amplitude parameter of S(t), $\phi_+$ is a first phase parameter of S(t), $A_-$ is a second amplitude parameter of S(t), $\phi$ is a second phase parameter of S(t), transmit power of the physical channel to which S(t) belongs is $P=A_+^2+A_-^2$, and the transmit power P constraints a value of polarization amplitudes of the two channels of signals.

To clearly describe the technical solutions in this embodiment of the present invention, in this embodiment, words such as "first" and "second" are used to distinguish items having the same functions or similar functions. Those skilled in the art may understand that words such as "first" and "second" do not limit the number of items or a sequence of execution.

According to the foregoing formula, the amplitude and the phase of S(t) may be adjusted simultaneously by adjusting each amplitude parameter and each phase parameter; or, only the amplitude of S(t) is adjusted, for example, when $\phi_+$ or $\phi_-$ is 0; or, only the phase of S(t) is adjusted, for example, when $A_+$ or $A_-$ is 0. For example, by adjusting the four parameters $A_+$, $\phi_+$; $A_-$, $\phi_-$, the signal polarization apparatus may obtain physical channel signals of different polarization manners:

When the polarization manner is +45° linear polarization, adjust $A_+ = \sqrt{P}$, $\phi_+ = 0$; $A_- = 0$;

when the polarization manner is −45° linear polarization, adjust $A_+ = 0$; $A_- = \sqrt{P}$, $\phi_- = 0$;

when the polarization manner is vertical linear polarization, adjust $A_+ = A_- = \sqrt{P/2}$, $\phi_+ = \phi_- = 0$;

when the polarization manner is horizontal linear polarization, adjust $A_+ = A_- = \sqrt{P/2}$, $\phi_+ = 0$, $\phi_- = \pi$;

when the polarization manner is linear polarization at any angle θ, adjust $A_+ = \cos\theta\sqrt{P}$, $A_- = \sin\theta\sqrt{P}$, $\phi_+ = 0$, $\phi_- = 0$;

when the polarization manner is left-hand circular polarization, adjust $A_+ = A_- = \sqrt{P/2}$, $\phi_+ = 0$, $\phi_- = -\pi/2$;

when the polarization manner is right-hand circular polarization, adjust $A_+ = A_- = \sqrt{P/2}$, $\phi_+ = 0$, $\phi_- = -\pi/2$;

when the polarization manner is general left-hand circular polarization, adjust $$A_+ = \sqrt{\frac{1}{1+\beta^2}P}, A_- = \sqrt{\frac{\beta^2}{1+\beta^2}P}; \varphi_+ = 0, \varphi_- = \pi/2,$$

where $\beta = A_-/A_+$ is an axial ratio;

when the polarization manner is general right-hand circular polarization, adjust $$A_+ = \sqrt{\frac{1}{1+\beta^2}P}, A_- = \sqrt{\frac{\beta^2}{1+\beta^2}P}; \varphi_+ = 0, \varphi_- = -\pi/2,$$

where $\beta = A_-/A_+$ is an axial ratio; and when the polarization manner is polarization of any shape, adjust according to the following formula:

$$\left(\frac{x}{A_+}\right)^2 + \left(\frac{y}{A_-}\right)^2 - 2\left(\frac{x}{A_+}\right)\left(\frac{y}{A_-}\right)\cos\Delta\phi = \sin^2\Delta\phi,$$

where $\Delta\phi = \phi_+ - \phi_-$.

Therefore, in this embodiment of the present invention, multiple carriers of a cell may be distinguished, multiple physical channel signals in a carrier are distinguished, and the physical channel signals are polarized and transmitted according to their respective polarization manners. A same set of physical antennas can transmit signals of different polarization requirements such as linear polarization and circular polarization.

In this embodiment of the present invention, through the signal polarization apparatus, signal polarization may be adjusted dynamically in real time when a system runs. Through adaptive adjustment of the polarization manner, performance of an entire system network is optimized. Moreover, adjustment for a polarization manner of a certain physical channel signal of any carrier does not interfere with running of other carriers or other physical channels. a polarization manner of each physical channel signal of each carrier is not bound any longer, and therefore, a normal operation of a service of a cell is not affected.

Further, for a signal stream transmitted in a multi-input multi-output (MIMO) manner, by using the solution in this embodiment of the present invention, multiple polarization manners may be adopted simultaneously. For example, for a certain pair of downlink MIMO signal streams, +45/−45° linear polarization may be adopted; for another pair of downlink MIMO signal streams, left-hand/right-hand orthogonal circular polarization may be adopted, and a terminal performs collaboration to form a MIMO polarization adaptive feedback adjustment loop, thereby further improving MIMO performance.

Further, for common delay transmit diversity, by using the solution in this embodiment of the present invention, for an original signal and a delayed signal, different polarization manners may be adopted. Therefore, a polarization diversity gain may be obtained in addition to time diversity.

Further, the signal polarization apparatus may perform polarization domain filtering on a physical channel signal received from a terminal, thereby suppressing signal interference and improving a first-attempt access success ratio of a mobile terminal. In this case, the signal polarization apparatus determines a polarization manner of each physical channel signal sent by the terminal first, and receives the physical channel signal in the polarization manner. That is, the signal polarization apparatus receives the physical channel signal in a polarization manner that is identical to the polarization manner of the physical channel signal. For example, the signal polarization apparatus identifies that a polarization manner of a received physical channel signal is vertical linear polarization, and therefore, the signal polarization apparatus receives the physical channel signal in a vertical polarization manner.

At the time of determining the polarization manner of each physical channel signal from the terminal, different polarization manners may be adopted to detect the physical channel signal. For example, manners such as vertical linear polarization, horizontal linear polarization, left-hand circular polarization, and right-hand circular polarization are adopted respectively to detect the physical channel signal and obtain various detection results. A polarization manner that corresponds to a detection result with a maximum amplitude is used as a polarization manner of the physical channel signal. For example, when the physical channel signal is detected in a vertical linear polarization manner, an amplitude of an obtained detection result is the greatest, and the vertical linear polarization is determined as a polarization manner of the physical channel signal.

With the technical solution provided in this embodiment of the present invention, a polarization manner of each physical channel signal in each carrier is distinguished, and an amplitude or a phase of each physical channel signal is adjusted to polarize the physical channel signals in a corresponding polarization manner. The technical solution in this embodiment of the present invention provides a solution to adjusting the signal polarization manner online, dynamically and in real time. Furthermore, at the time of adjustment, an antenna does not need to be replaced, and a physical installation posture of the antenna does not need to be adjusted manually either. Therefore, a manual requirement and an operation cost are reduced, a workload, work risk and time are reduced, and a normal operation of a service of a cell is ensured.

Figure 3:
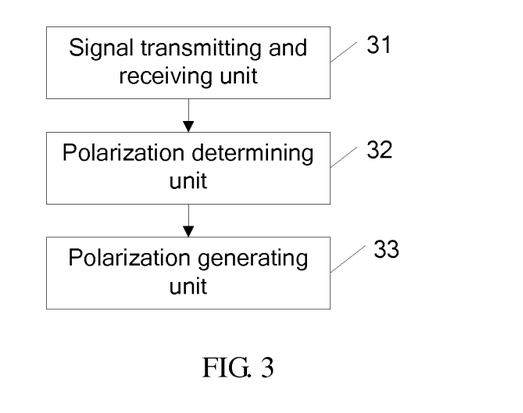
FIG. 3 is a schematic structural diagram of a signal polarization apparatus according to another embodiment of the present invention.

Another embodiment of the present invention provides a signal polarization apparatus. As shown in FIG. 3, the apparatus includes:

a signal transmitting and receiving unit 31, configured to receive physical channel signals sent by a base transceiver station;

a polarization determining unit 32, configured to determine a polarization manner of each physical channel signal; and a polarization generating unit 33, configured to polarize, by adjusting at least one of an amplitude and a phase of each physical channel signal, the physical channel signals according to the polarization manner.

The polarization generating unit 33 includes: a signal distinguishing module 331, configured to distinguish the physical channel signals into two channels of signals; and an amplitude/phase weighting module 332, configured to polarize the physical channel signals by adjusting at least one of amplitudes and phases of the two channels of signals respectively, where the two channels of signals are obtained by the signal distinguishing module 331.

Further, the signal distinguishing module 331 is specifically configured to distinguish, based on transmit power of a corresponding physical channel, the physical channel signals into two channels of signals according to the following formula:

$$S_+(t)=A_+\exp(j\phi_+)S(t); S_-(t)=A_-\exp(j\phi_-)S(t).$$

$S(t)$ represents a physical channel signal, $A_+$ is a first amplitude parameter of $S(t)$, $\phi_+$ is a first phase parameter of $S(t)$, $A_-$ is a second amplitude parameter of $S(t)$, $\phi$ is a second phase parameter of $S(t)$, and transmit power of the physical channel to which $S(t)$ belongs is $P=A_+^2+A_-^2$.

Furthermore, the amplitude/phase weighting module is specifically configured to perform at least one of the following adjustment:

When the polarization manner is +45° linear polarization, adjust $A_+=\sqrt{P}$, $\phi_+=0$; $A_-=0$;

when the polarization manner is −45° linear polarization, adjust $A_+=0$; $A_-=\sqrt{P}$, $\phi_-=0$;

when the polarization manner is vertical linear polarization, adjust $A_+=A_-=\sqrt{P/2}$, $\phi_+=\phi_-=0$;

when the polarization manner is horizontal linear polarization, adjust $A_+=A_-=\sqrt{P/2}$, $\phi_+=0$, $\phi_-=\pi$;

when the polarization manner is linear polarization at any angle θ, adjust $A_+=\cos\theta\sqrt{P}$, $A_-=\sin\theta\sqrt{P}$, $\phi_+=0$, $\phi_{31}=0$;

when the polarization manner is left-hand circular polarization, adjust $A_+=A_-=\sqrt{P/2}$, $\phi_+=0$, $\phi_-=\pi/2$;

when the polarization manner is right-hand circular polarization, adjust $A_+=A_-=\sqrt{P/2}$, $\phi_+=0$, $\phi_-=-\pi/2$;

when the polarization manner is general left-hand circular polarization, adjust $$A_+ = \sqrt{\frac{1}{1+\beta^2}P}, A_- = \sqrt{\frac{\beta^2}{1+\beta^2}P}; \varphi_+ = 0, \varphi_- = \pi/2,$$

where $\beta=A_-/A_+$ is an axial ratio;

when the polarization manner is general right-hand circular polarization, adjust $$A_+ = \sqrt{\frac{1}{1+\beta^2}P}, A_- = \sqrt{\frac{\beta^2}{1+\beta^2}P}; \varphi_+ = 0, \varphi_- = -\pi/2,$$

where $\beta=A_-/A_+$ is an axial ratio; and when the polarization manner is polarization of any shape, adjust according to the following formula:

$$\left(\frac{x}{A_+}\right)^2 + \left(\frac{y}{A_-}\right)^2 - 2\left(\frac{x}{A_+}\right)\left(\frac{y}{A_-}\right)\cos\Delta\phi = \sin^2\Delta\phi,$$

where $\Delta\phi=\phi_+-\phi_-$.

Figure 4A:
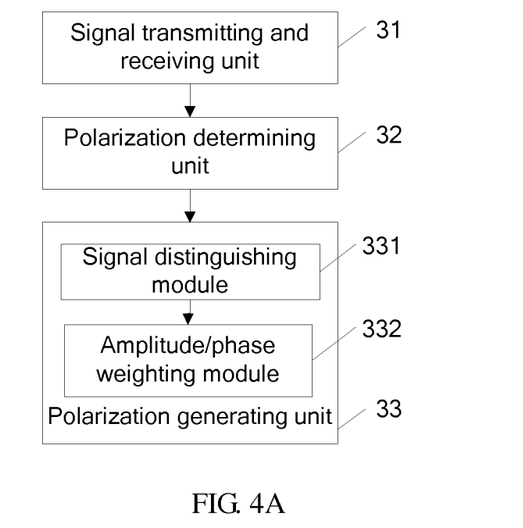
FIG. 4A is a schematic structural diagram of another signal polarization apparatus according to another embodiment of the present invention.
Figure 4B:
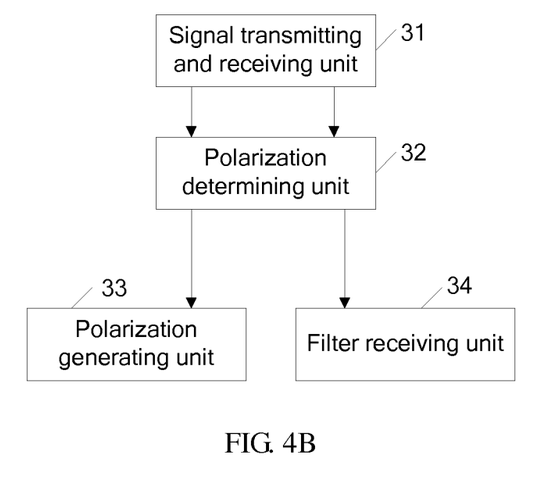
FIG. 4B is a schematic structural diagram of another signal polarization apparatus according to another embodiment of the present invention.

To improve a first-attempt access success ratio of a mobile terminal and achieve an effect of polarization-domain filtering, the signal polarization apparatus can perform filtering on a polarized physical channel signal sent by the terminal. In this case, the signal transmitting and receiving unit 31 is configured to receive a physical channel signal sent by the terminal; and the polarization determining unit 32 is configured to determine a polarization manner of the physical channel signal sent by the terminal. As shown in FIG. 4, the apparatus further includes a filter receiving unit 34, configured to receive the physical channel signal in a polarization manner that is identical to the polarization manner of the physical channel signal sent by the terminal.

For specific working manners of functional modules and units in the apparatus embodiments of the present invention, reference is made to the method embodiments of the present invention. The functional modules and units in the apparatus embodiments of the present invention may be implemented separately, and may also be implemented by being integrated in one or more units. For example, the filter receiving unit 34 and the polarization generating unit 33 may be implemented by the same module. With the technical solution provided in this embodiment of the present invention, a polarization manner of each physical channel signal in each carrier is distinguished, and an amplitude or a phase of each physical channel signal is adjusted to polarize the physical channel signals in a corresponding polarization manner. The technical solution in this embodiment of the present invention provides a solution to adjusting the signal polarization manner online, dynamically, and in real time. Furthermore, at the time of adjustment, an antenna does not need to be replaced, and a physical installation posture of the antenna does not need to be adjusted manually either. Therefore, a manual requirement and an operation cost are reduced, a workload, work risk and time are reduced, and a normal operation of a service of a cell is ensured.

Another embodiment of the present invention provides a dual-polarized antenna system. The antenna includes at least two polarization units, and the system includes the signal polarization apparatus described in the foregoing embodiment. The signal polarization apparatus includes: a signal transmitting and receiving unit, configured to receive physical channel signals sent by a base transceiver station; a polarization determining unit, configured to determine a polarization manner of each physical channel signal; and a polarization generating unit, configured to polarize, by adjusting at least one of an amplitude and a phase of each physical channel signal, the physical channel signals according to the polarization manner.

Figure 5:
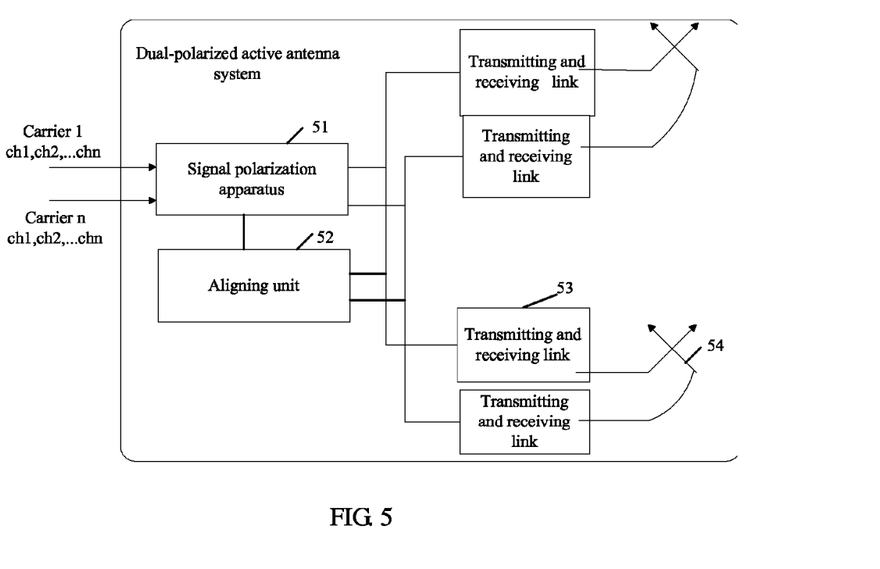
FIG. 5 is a schematic diagram of a dual-polarized active antenna system according to another embodiment of the present invention.

As shown in FIG. 5, an embodiment of the present invention provides a dual-polarized active (Active) antenna system. A signal polarization apparatus 51 receives physical channel signals from a base transceiver station, for example, from physical channel signals 1 (ch1) to n (chn) in a carrier (Carrier) 1 to physical channel signals 1 to n in a carrier n. In this system, each polarization unit 54 in the antenna is connected to a transmitting and receiving (TX/RX) link unit 53.

Figure 6:
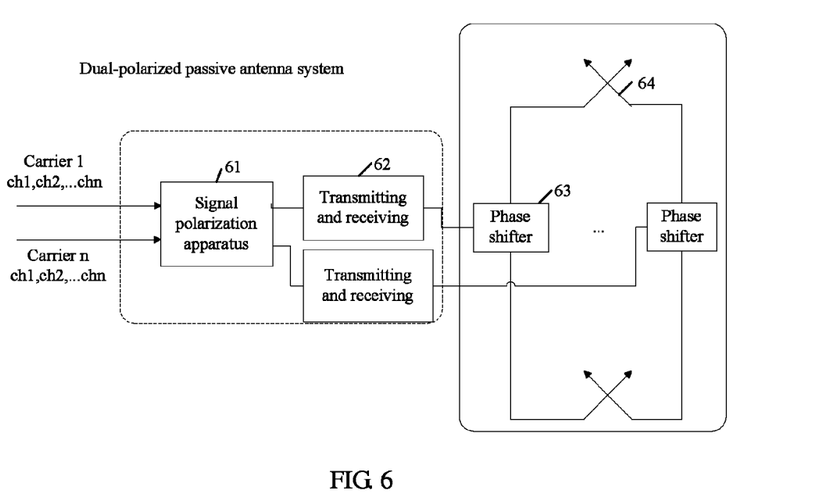
FIG. 6 is a schematic diagram of a dual-polarized active antenna system according to another embodiment of the present invention.

As shown in FIG. 6, an embodiment of the present invention provides a dual-polarized passive (Passive) antenna system. A signal polarization apparatus 61 receives physical channel signals from a base transceiver station. In this system, all polarization units 64 in all antennas in the system are divided into two groups that correspond to each other. Each group of polarization units 64 are connected to a transmitting and receiving (TX/RX) link unit 62 through a phase shifter (or power splitter).

The signal polarization apparatus 51 and the signal polarization apparatus 61 have the same structure. A polarization generating unit in the signal polarization apparatus includes:

a signal distinguishing module, configured to distinguish physical channel signals into two channels of signals; and an amplitude/phase weighting module, configured to polarize the physical channel signals by adjusting at least one of amplitudes and phases of the two channels of signals, where the two channels of signals are obtained by the distinguishing module.

The signal distinguishing module is specifically configured to distinguish, based on transmit power of a corresponding physical channel, the physical channel signals into two channels of signals according to the following formula:

$$S_+(t)=A_+\exp(j\phi_+)S(t); \text{ and } S_-(t)=A_-\exp(j\phi_-)S(t).$$

S(t) represents a physical channel signal, $A_+$ is a first amplitude parameter of S(t), $\phi_+$ is a first phase parameter of S(t), $A_-$ is a second amplitude parameter of S(t), $\phi_-$ is a second phase parameter of S(t), and transmit power of the physical channel to which S(t) belongs is $P=A_+^2+A_-^2$.

Further, the amplitude/phase weighting module is specifically configured to perform at least one of the following adjustment:

When the polarization manner is +45° linear polarization, adjust $A_+=\sqrt{P}$, $\phi_+=0$; $A_-=0$;

when the polarization manner is −45° linear polarization, adjust $A_+=0$; $A_-=\sqrt{P}$, $\phi_-=0$;

when the polarization manner is vertical linear polarization, adjust $A_+=A_-=\sqrt{P/2}$, $\phi_+=\phi_-=0$;

when the polarization manner is horizontal linear polarization, adjust $A_+=A_-=\sqrt{P/2}$, $\phi_+=0$, $\phi_-=\pi$;

when the polarization manner is linear polarization at any angle θ, adjust $A_+=\cos\theta\sqrt{P}$, $A_-=\sin\theta\sqrt{P}$, $\phi_+=0$, $\phi_-=0$;

when the polarization manner is left-hand circular polarization, adjust $A_+=A_-=\sqrt{P/2}$, $\phi_+=0$, $\phi_-=\pi/2$;

when the polarization manner is right-hand circular polarization, adjust $A_+=A_-=\sqrt{P/2}$, $\phi_+=0$, $\phi_-=-\pi/2$;

when the polarization manner is general left-hand circular polarization, adjust $$A_+ = \sqrt{\frac{1}{1+\beta^2}P}, A_- = \sqrt{\frac{\beta^2}{1+\beta^2}P}; \varphi_+ = 0, \varphi_- = \pi/2,$$

where $\beta=A_-/A_+$ is an axial ratio;

when the polarization manner is general right-hand circular polarization, adjust $$A_+ = \sqrt{\frac{1}{1+\beta^2}P}, A_- = \sqrt{\frac{\beta^2}{1+\beta^2}P}; \varphi_+ = 0, \varphi_- = -\pi/2,$$

where $\beta=A_-/A_+$ is an axial ratio; and when the polarization manner is polarization of any shape, adjust according to the following formula:

$$\left(\frac{x}{A_+}\right)^2 + \left(\frac{y}{A_-}\right)^2 - 2\left(\frac{x}{A_+}\right)\left(\frac{y}{A_-}\right)\cos\Delta\phi = \sin^2\Delta\phi,$$

where $\Delta\phi=\phi_+-\phi_-$.

Further, as shown in FIG. 5, to achieve an expected running effect of a system, an alignment operation needs to be performed first. An aligning unit 52 is connected to the signal polarization apparatus 51 and the transmitting and receiving link unit 53, and is configured to align at least one of an amplitude, a phase, and a delay of a physical channel signal in the signal polarization apparatus 51 and the transmitting and receiving link unit 53, so that consistency of an amplitude, a phase and a delay between various transmit channels and between various receiving channels is ensured. Similarly, an aligning unit may also be connected to the signal polarization apparatus 61 and the transmitting and receiving link unit 62 in FIG. 6, and is configured to align at least one of an amplitude, a phase, and a delay of a physical channel signal in the signal polarization apparatus 61 and the transmitting and receiving link unit 62.

Figure 7:
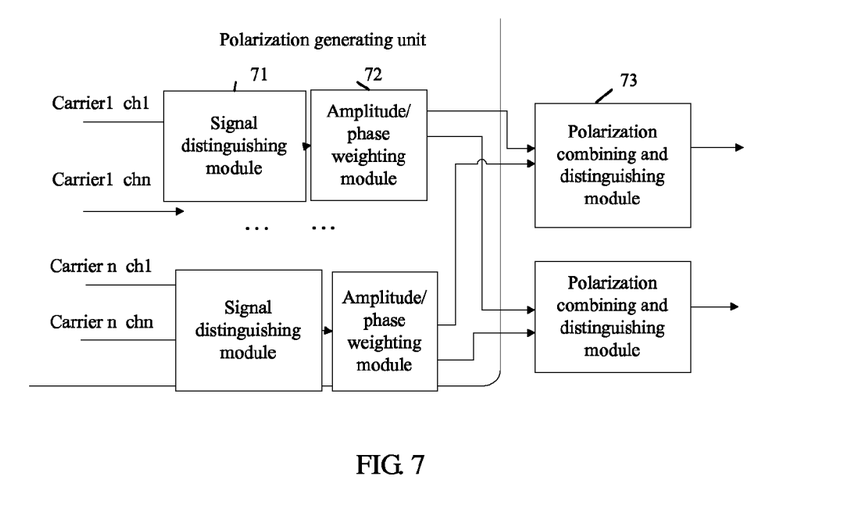
FIG. 7 is a schematic structural diagram of a polarization generating unit according to another embodiment of the present invention.

FIG. 7 is a schematic structural diagram of a polarization generating unit in a signal polarization apparatus according to an embodiment of the present invention. FIG. 7 primarily shows a signal distinguishing module 71, an amplitude/phase weighting (Amplitude/Phase Weighting) module 72, and a polarization combining and distinguishing module 73 of the polarization generating unit. After determining a polarization manner of each physical channel signal in each carrier (Carrier) from a base transceiver station, a polarization determining unit sends physical channel signals to the polarization generating unit. The polarization generating unit uses the signal distinguishing module 71 to distinguish the physical channel signals into two channels of signals, uses the amplitude/phase weighting module 72 to adjust at least one of amplitudes and phases of the two channels of signals to polarize the physical channel signals, and uses the polarization combining and distinguishing module 73 to overlay physical channel signals that have the same polarization manner, and sends an overlaid physical channel signal to a polarization unit of an antenna. One amplitude/phase weighting module may be used to polarize all physical channel signals, or one amplitude/phase weighting module may be used to polarize a corresponding physical channel signal for each polarization manner. Illustratively, in a scenario that a physical channel signal is polarized in a +45° or −45° linear polarization manner, the amplitude/phase weighting module is configured to adjust distinguish signals according to $A_+=\sqrt{P}$, $\phi_+=0$, $A_-=0$ or $A_+=0$, $A_-=\sqrt{P}$, $\phi_-=0$. The polarization combining and distinguishing module is configured to: overlay physical channel signals that are polarized in a +45° linear polarization manner, combine the signals into one channel of signal, and send the channel of signal to the polarization unit of the antenna; and overlay physical channel signals that are polarized in a −45° linear polarization manner, combine the signals into one channel of signal, and send the channel of signal to the polarization unit of the antenna.

Figure 8:
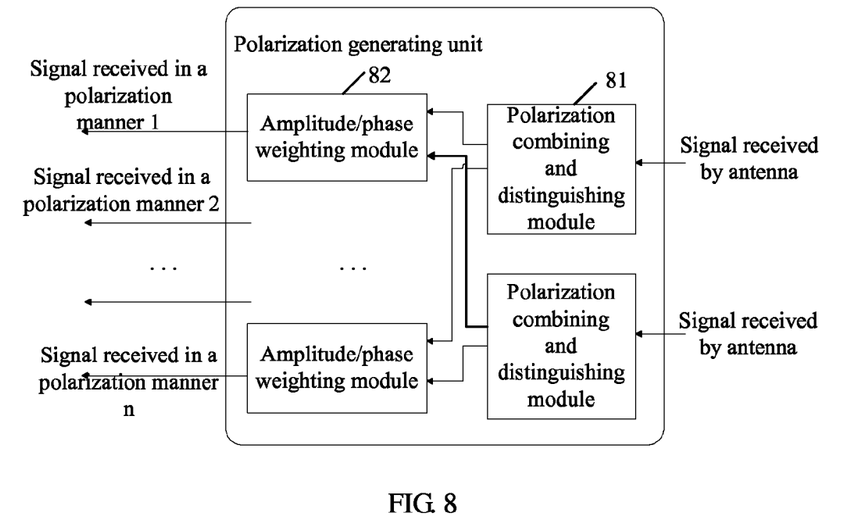
FIG. 8 is a schematic diagram of a working principle of a polarization generating unit according to another embodiment of the present invention.

The dual-polarized antenna system can also receive a physical channel signal sent by a terminal through the antenna, where the physical channel signal sent by the terminal is a polarized physical channel signal. With the solution provided in this embodiment of the present invention, polarization-domain filtering can be performed on the physical channel signal sent by the terminal, which suppresses signal interference and improves a first-attempt access success ratio of a mobile terminal. A filter receiving unit may be newly added to the signal polarization apparatus of the dual-polarized antenna system to implement the foregoing function, and the polarization generating unit in the signal polarization apparatus may also be used to implement the foregoing function. FIG. 8 is a schematic diagram of a working principle of using a polarization generating unit to implement the foregoing function according to an embodiment of the present invention. The polarization generating unit may include a polarization combining and distinguishing module 81, and an amplitude/phase weighting module 82. A polarization determining unit determines a polarization manner of each physical channel signal received from a terminal. For example, the polarization determining unit adopts different polarization manners to detect the physical channel signal, and uses a polarization manner that corresponds to a detection result with a maximum amplitude as a polarization manner of the physical channel signal. Afterward, the polarization generating unit uses the polarization combining and distinguishing module 81 to separate, according to the polarization manner, the physical channel signal received from the terminal, namely, divide physical channel signals of the same polarization manner into one group, so as to receive a separated physical channel signal in a polarization manner that is identical to a polarization manner of the separated physical channel signal. For example, each group of physical channel signals are sent to the amplitude/phase weighting module 82. The amplitude/phase weighting module 82 can identify a polarization manner of each group of physical channel signals, processes the physical channel signals in a polarization manner that is identical to a polarization manner of this group of physical channel signals, and sends the physical channel signals into a base transceiver station for processing such as decoding, and then send the physical channel signals to a network.

With the technical solution provided in this embodiment of the present invention, a polarization manner of each physical channel signal in each carrier is distinguished, and an amplitude or a phase of each physical channel signal is adjusted to polarize the physical channel signals in a corresponding polarization manner. The technical solution in this embodiment of the present invention provides a solution to adjusting the signal polarization manner online, dynamically, and in real time. Furthermore, at the time of adjustment, an antenna does not need to be replaced, and a physical installation posture of the antenna does not need to be adjusted manually either. Therefore, a manual requirement and an operation cost are reduced, a workload, work risk and time are reduced, and a normal operation of a service of a cell is ensured.

Persons skilled in the art may clearly understand that the present invention may be accomplished through software plus a necessary universal hardware platform. Based on this understanding, the technical solution of the present invention or the part that makes contributions to the prior art may be substantially embodied in the form of a software product. The computer software product may be stored in a storage media, such as, a ROM/RAM, a magnetic disk, or an optical disk, and includes several instructions used to enable a computer device (for example, a personal computer, a server, or a network device) to perform each embodiment of the present invention or the method described in some parts of the embodiment.

The foregoing descriptions are only specific implementation manners of the present invention, but are not intended to limit the protection scope of the present invention. Any modification or substitution readily conceivable by those skilled in the art within the technical scope disclosed in the present invention shall all fall within the protection scope of the present invention. Therefore, the protection scope of the present invention shall be subject to that of the appended claims.

What is claimed is:

1. A signal polarization method, comprising:
   receiving physical channel signals sent by a base transceiver station;
   determining a polarization manner of each physical channel signal; and
   polarizing, by adjusting at least one of an amplitude and a phase of each physical channel signal, the physical channel signals according to the polarization manner;
   the polarizing, by adjusting at least one of the amplitude and the phase of each physical channel signal, the physical channel signals according to the polarization manner comprises:
   distinguishing the physical channel signals two channels of signals; and
   polarizing, by adjusting at least one of amplitudes and phases of the two channels of signals respectively, the physical channel signals according to the polarization manner;
   the distinguishing the physical channel signals into two channels of signals comprises:
   distinguishing, based on transmit power of a corresponding physical channel, the physical channel signals into two channels of signals according to the following formula:

$S_+(t)=A_+\exp(j\phi_+)S(t); S_-(t)=A_-\exp(j\phi_-)S(t)$, wherein,

S(t) represents a physical channel signal, $A_+$ is a first amplitude parameter of S(t), $\phi_+$ is a first phase parameter of S(t), $A_-$ is a second amplitude parameter of S(t), $\phi_-$ is a second phase parameter of S(t), and transmit power of the physical channel to which S(t) belongs is $P=A_+^2+A_-^2$.

2. The method according to claim 1, wherein:
   the polarizing, by adjusting at least one of the amplitudes and the phases of the two channels of signals respectively, the physical channel signal according to the polarization manner comprises at least one of the following adjustment:
   when the polarization manner is +45° linear polarization, adjusting $A_+=\sqrt{P}, \phi_+=0; A_-=0$;
   when the polarization manner is −45° linear polarization, adjusting $A_+=0; A_-=\sqrt{P}, \phi_-=0$;
   when the polarization manner is vertical linear polarization, adjusting $A_+=A_-=\sqrt{P/2}, \phi_+=\phi_-=0$;
   when the polarization manner is horizontal linear polarization, adjusting $A_+=A_-\sqrt{P/2}, \phi_+=0, \phi_-=\pi$;
   when the polarization manner is linear polarization at any angle θ, adjusting $A_+=\cos\theta\sqrt{P}, A_-=\sin\theta\sqrt{P}, \phi_+=0, \phi_-=0$;
   when the polarization manner is left-hand circular polarization, adjusting $A_+=A_-=\sqrt{P/2}, \phi_+=0, \phi_-=\pi/2$;
   when the polarization manner is right-hand circular polarization, adjusting $A_+=A_-=\sqrt{P/2}, \phi_+=0, \phi_-=-\pi/2$;
   when the polarization manner is general left-hand circular polarization, adjusting $$A_+ = \sqrt{\frac{1}{1+\beta^2}}P, A_- = \sqrt{\frac{\beta^2}{1+\beta^2}}P; \varphi_+ = 0, \varphi_- = \pi/2,$$

wherein $\beta=A_-/A_+$ is an axial ratio;
   when the polarization manner is general right-hand circular polarization, adjusting $$A_+ = \sqrt{\frac{1}{1+\beta^2}}P, A_- = \sqrt{\frac{\beta^2}{1+\beta^2}}P; \varphi_+ = 0, \varphi_- = -\pi/2,$$

wherein $\beta=A_-/A_+$ is an axial ratio; and
   when the polarization manner is polarization of any shape, adjusting according to the following formula:

$$\left(\frac{x}{A_+}\right)^2 + \left(\frac{y}{A_-}\right)^2 - 2\left(\frac{x}{A_+}\right)\left(\frac{y}{A_-}\right)\cos\Delta\phi = \sin^2\Delta\phi,$$

wherein $\Delta\phi=\phi_+-\phi_-$.

3. The method according to claim 1, further comprising:
receiving a physical channel signal sent by a terminal;
determining a polarization manner of the physical channel signal sent by the terminal; and
processing the physical channel signal in a polarization manner that is identical to the polarization manner of the physical channel signal sent by the terminal.

4. The method according to claim 3, wherein:
the determining the polarization manner of the physical channel signal sent by the terminal comprises:
adopting different polarization manners to detect the physical channel signal sent by the terminal, and using a polarization manner that corresponds to a detection result with a maximum amplitude as the polarization manner of the physical channel signal.

5. A signal polarization apparatus, comprising:
a signal transmitting and receiving unit, configured to receive physical channel signals sent by a base transceiver station;
a polarization determining unit, configured to determine a polarization manner of each physical channel signal; and
a polarization generating unit, configured to polarize, by adjusting at least one of an amplitude and a phase of each physical channel signal, the physical channel signals according to the polarization manner;
wherein the polarization generating unit comprises:
a signal distinguishing module, configured to distinguish the physical channel signals into two channels of signals; and
an amplitude/phase weighting module, configured to polarize, by adjusting at least one of amplitudes and phases of the two channels of signals, the physical channel signals according to the polarization manner, wherein the two channels of signals are obtained by the signal distinguishing module;
wherein the signal distinguishing module is specifically configured to distinguish, based on transmit power of a corresponding physical channel, the physical channel signals into two channels of signals according to the following formula:

$$S_+(t)=A_+\exp(j\phi_+)S(t); S_-(t)=A_-\exp(j\phi_-)S(t), \text{ wherein,}$$

S(t) represents a physical channel signal, $A_+$ is a first amplitude parameter of S(t), $\phi_+$ is a first phase parameter of S(t), $A_-$ is a second amplitude parameter of S(t), $\phi_-$ is a second phase parameter of S(t), and transmit power of the physical channel to which S(t) belongs is $P=A_+^2+A_-^2$.

6. The apparatus according to claim 5, wherein: the amplitude/phase weighting module is specifically configured to perform at least one of the following adjustment:
when the polarization manner is +45° linear polarization, adjust $A_+=\sqrt{P}$, $\phi_+=0$; $A_-=0$;
when the polarization manner is −45° linear polarization, adjust $A_+=0$; $A_-=\sqrt{P}$, $\phi_-=0$;
when the polarization manner is vertical linear polarization, adjust $A_+=A_-=\sqrt{P/2}$, $\phi_+=\phi_-=0$;
when the polarization manner is horizontal linear polarization, adjust $A_+=A_-=\sqrt{P/2}$, $\phi_+=0$, $\phi_-=\pi$;
when the polarization manner is linear polarization at any angle θ, adjust $A_+=\cos\theta\sqrt{P}$, $A_-=\sin\theta\sqrt{P}$, $\phi_+=0$, $\phi_-=0$;
when the polarization manner is left-hand circular polarization, adjust $A_+=A_-=\sqrt{P/2}$, $\phi_+=0$, $\phi_-=\pi/2$;
when the polarization manner is right-hand circular polarization, adjust $A_+=A_-=\sqrt{P/2}$, $\phi_+=0$, $\phi_-=-\pi/2$;
when the polarization manner is general left-hand circular polarization, adjust $$A_+ = \sqrt{\frac{1}{1+\beta^2}P}, A_- = \sqrt{\frac{\beta^2}{1+\beta^2}P}; \varphi_+ = 0, \varphi_- = \pi/2,$$

wherein $\beta=A_-/A_+$ is an axial ratio;
when the polarization manner is general right-hand circular polarization, adjust $$A_+ = \sqrt{\frac{1}{1+\beta^2}P}, A_- = \sqrt{\frac{\beta^2}{1+\beta^2}P}; \varphi_+ = 0, \varphi_- = -\pi/2,$$

wherein $\beta=A_-/A_+$ is an axial ratio; and
when the polarization manner is polarization of any shape, adjust according to the following formula:

$$\left(\frac{x}{A_+}\right)^2 + \left(\frac{y}{A_-}\right)^2 - 2\left(\frac{x}{A_+}\right)\left(\frac{y}{A_-}\right)\cos\Delta\phi = \sin^2\Delta\phi,$$

wherein $\Delta\phi=\phi_+-\phi_-$.

7. The apparatus according to claim 5, wherein: the apparatus further includes a filter receiving unit; wherein,
the signal transmitting and receiving unit is further configured to receive a physical channel signal sent by a terminal;
the polarization determining unit is further configured to determine a polarization manner of the physical channel signal sent by the terminal; and
the filter receiving unit is configured to process, in a polarization manner that is identical to the polarization manner of the physical channel signal sent by the terminal, the physical channel signal sent by the terminal.

8. A dual-polarized antenna system, wherein: an antenna in the system comprises at least two polarization units, and the system comprises a signal polarization apparatus, the signal polarization apparatus comprises:
a signal transmitting and receiving unit, configured to receive physical channel signals sent by a base transceiver station;
a polarization determining unit, configured to determine a polarization manner of each physical channel signal; and
a polarization generating unit, configured to polarize, by adjusting at least one of an amplitude and a phase of each physical channel signal, the physical channel signals according to the polarization manner;
wherein the polarization generating unit comprises:
a signal distinguishing module, configured to distinguish the physical channel signals into two channels of signals; and
an amplitude/phase weighting module, configured to polarize, by adjusting at least one of amplitudes and phases of the two channels of signals, the physical channel signals according to the polarization manner, wherein the two channels of signals are obtained by the signal distinguishing module;

wherein the signal distinguishing module is specifically configured to distinguish, based on transmit power of a corresponding physical channel, the physical channel signals into two channels of signals according to the following formula:

$$S_+(t)=A_+\exp(j\phi_+)S(t); S_-(t)=A_-\exp(j\phi_-)S(t), \text{ wherein,}$$

S(t) represents a physical channel signal, $A_+$ is a first amplitude parameter of S(t), $\phi_+$ is a first phase parameter of S(t), $A_-$ is a second amplitude parameter of S(t), $\phi_-$ is a second phase parameter of S(t), and transmit power of the physical channel to which S(t) belongs is $P=A_+^2+A_-^2$.

9. The apparatus according to claim 8, wherein: the amplitude/phase weighting module is specifically configured to perform at least one of the following adjustment:

when the polarization manner is +45° linear polarization, adjust $A_+=\sqrt{P}$, $\phi_+=0$; $A_-=0$;

when the polarization manner is −45° linear polarization, adjust $A_+=0$; $A_-=\sqrt{P}$, $\phi_-=0$;

when the polarization manner is vertical linear polarization, adjust $A_+=A_-=\sqrt{P/2}$, $\phi_+=\phi_-=0$;

when the polarization manner is horizontal linear polarization, adjust $A_+=A_-=\sqrt{P/2}$, $\phi_+=0$, $\phi_-=\pi$;

when the polarization manner is linear polarization at any angle θ, adjust $A_+=\cos\theta\sqrt{P}$, $A_-=\sin\theta\sqrt{P}$, $\phi_+=0$, $\phi_-=0$;

when the polarization manner is left-hand circular polarization, adjust $A_+=A_-=\sqrt{P/2}$, $\phi_+=0$, $\phi_-=\pi/2$;

when the polarization manner is right-hand circular polarization, adjust $A_+=A_-=\sqrt{P/2}$, $\phi_+=0$, $\phi_-=-\pi/2$;

when the polarization manner is general left-hand circular polarization, adjust $$A_+ = \sqrt{\frac{1}{1+\beta^2}P}, A_- = \sqrt{\frac{\beta^2}{1+\beta^2}P}; \varphi_+ = 0, \varphi_- = \pi/2,$$

wherein $\beta=A_-/A_+$ is an axial ratio;

when the polarization manner is general right-hand circular polarization, adjust $$A_+ = \sqrt{\frac{1}{1+\beta^2}P}, A_- = \sqrt{\frac{\beta^2}{1+\beta^2}P}; \varphi_+ = 0, \varphi_- = -\pi/2,$$

wherein $\beta=A_-/A_+$ is an axial ratio; and when the polarization manner is polarization of any shape, adjust according to the following formula:

$$\left(\frac{x}{A_+}\right)^2 + \left(\frac{y}{A_-}\right)^2 - 2\left(\frac{x}{A_+}\right)\left(\frac{y}{A_-}\right)\cos\Delta\phi = \sin^2\Delta\phi,$$

wherein $\Delta\phi=\phi_+-\phi_-$.

10. The apparatus according to claim 8, wherein: the apparatus further includes a filter receiving unit; wherein, the signal transmitting and receiving unit is further configured to receive a physical channel signal sent by a terminal;

the polarization determining unit is further configured to determine a polarization manner of the physical channel signal sent by the terminal; and the filter receiving unit is configured to process, in a polarization manner that is identical to the polarization manner of the physical channel signal sent by the terminal, the physical channel signal sent by the terminal.

11. The system according to claim 8, wherein:

each polarization unit is connected to a transmitting and receiving link unit; or all polarization units in the system are divided into two groups that correspond to each other, and each group of polarization units are connected to a transmitting and receiving link unit through a phase shifter or power splitter; and the transmitting and receiving link unit is configured to receive physical channel signals from the signal polarization apparatus and send the physical channel signals to a terminal; or receive a physical channel signal from the terminal and forward the physical channel signal to the signal polarization apparatus.

12. The system according to claim 11, further comprising an aligning unit, wherein:

the aligning unit is configured to align at least one of an amplitude, a phase, and a delay of a physical channel signal in the signal polarization apparatus and the transmitting and receiving link unit.

13. The system according to claim 8, wherein the polarization generating unit of the signal polarization apparatus further comprises a polarization combining and distinguishing module, wherein:

the polarization combining and distinguishing module, configured to: overlay physical channel signals that are polarized in the same polarization manner and are from a base transceiver station, and send the overlaid physical channel signal to the polarization unit of the antenna; or the polarization combining and distinguishing module is configured to: separate physical channel signals that are received from a terminal and have the same polarization manner, so as to receive a separated physical channel signal in a polarization manner that is identical to a polarization manner of the separated physical channel signal.

* * * * *